(No Model.) 4 Sheets—Sheet 2.

M. MUSGREAVE.
EXPANSION PULLEY.

No. 563,399. Patented July 7, 1896.

WITNESSES:

INVENTOR
Mark Musgreave
BY
John Shinn
ATTORNEY.

(No Model.) M. MUSGREAVE. 4 Sheets—Sheet 3.
EXPANSION PULLEY.

No. 563,399. Patented July 7, 1896.

WITNESSES: INVENTOR
W. Marcus Shinn. Mark Musgreave
W. Musgreave BY
John Shinn
ATTORNEY.

(No Model.)  M. MUSGREAVE.  4 Sheets—Sheet 4.
EXPANSION PULLEY.

No. 563,399.  Patented July 7, 1896.

WITNESSES:  INVENTOR
N. Marcus Shinn.  Mark Musgreave,
P. E. Wunderlich.  By John Shinn, Attorney.

UNITED STATES PATENT OFFICE.

MARK MUSGREAVE, OF PHILADELPHIA, PENNSYLVANIA, ASSIGNOR OF ONE-HALF TO JOSEPH F. BLAIR, OF CAMDEN, NEW JERSEY.

EXPANSION-PULLEY.

SPECIFICATION forming part of Letters Patent No. 563,399, dated July 7, 1896.

Application filed December 14, 1895. Serial No. 572,176. (No model.)

*To all whom it may concern:*

Be it known that I, MARK MUSGREAVE, a subject of the Queen of Great Britain, residing at Philadelphia, in the county of Philadelphia and State of Pennsylvania, have invented a new and useful Improvement in Expansion-Pulleys, of which the following is a specification.

My invention relates to expansion-pulleys, and its object is to provide a mechanism by which a varying speed may be readily obtained for driving a class of machinery requiring variable speeds; and the invention consists in, first, the combination and arrangement of two pulleys divided into a series of sections, each section at the center end of its arm being provided with an inclining lug or foot, which foot is fitted in and made to slide in an inclining slot formed on a spider by square bars, said spider being mounted loose and made to slide on a shaft; second, in the combination and arrangement of two shifting forks mounted on a square tube, which tube carrying the shifting forks is made to slide on its supporting-shaft by means of a screw-thread cut on said supporting-shaft; third, in the combination and arrangement of two shifting forks mounted on a square tube and a shaft carrying a right and left hand screw-thread, by which threads and shifting forks both pulleys may at the same time be contracted or expanded, making the device a clutch for stopping and starting; fourth, in the combination and arrangement of a loose sliding collar on the pulley-shaft. Said collar is provided with inclined pockets for holding the guide-rods, said collar being connected and operated by two or more regulating-bolts, by which collar the slots and guide-rods are adjusted to give the feet of the pulley-sections a good fit in the slots, in which they work. I attain these objects by the mechanism illustrated in the accompanying drawings, in which—

Figure 1:
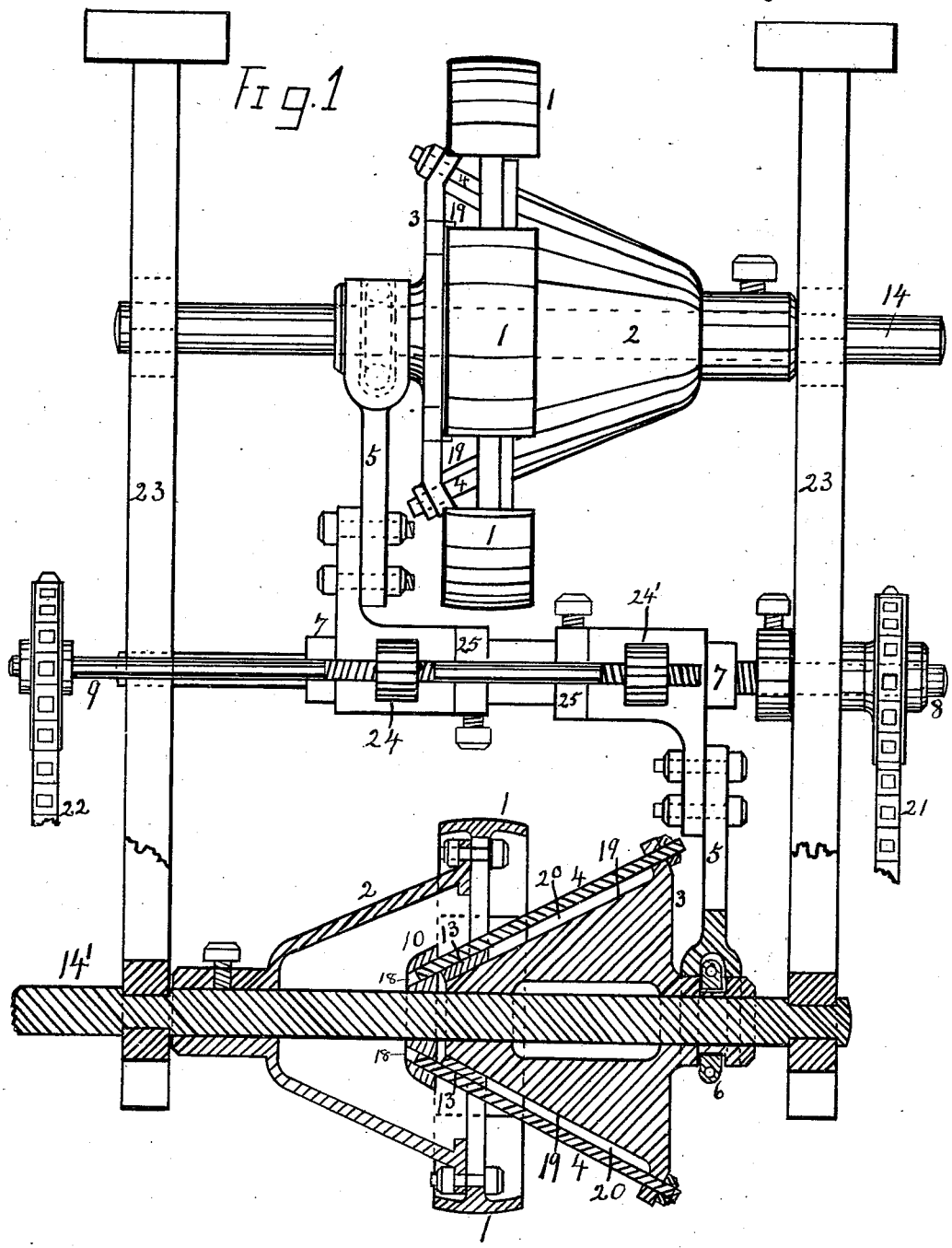
Figure 2:
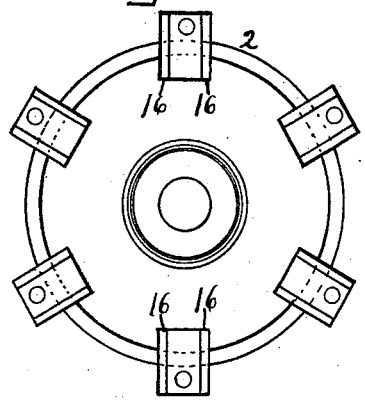
Figure 3:
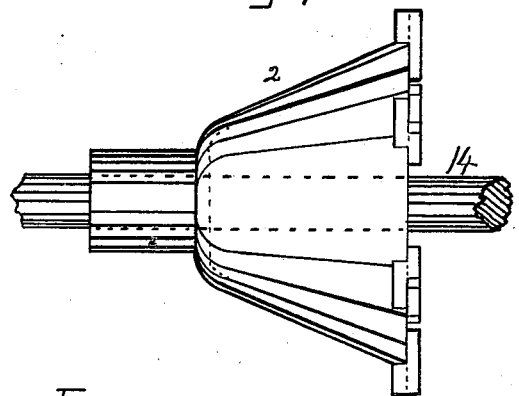
Figure 4:
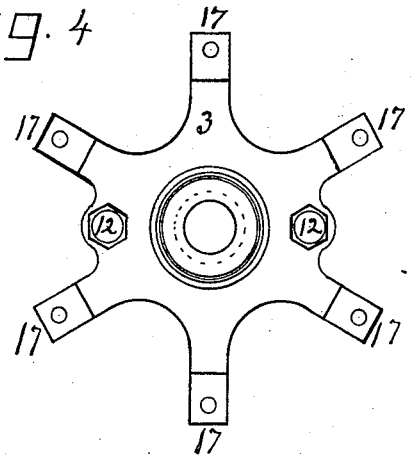
Figure 5:
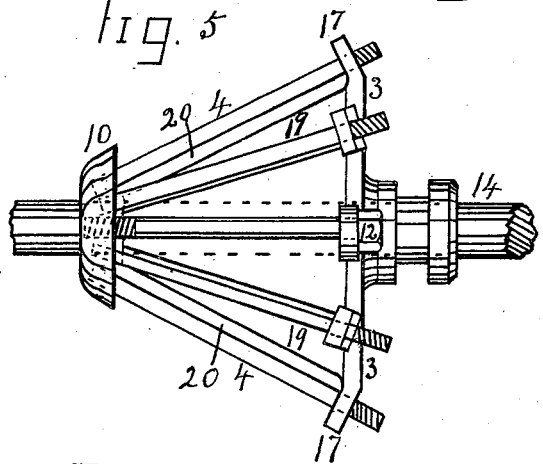
Figure 6:
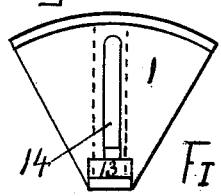
Figure 7:
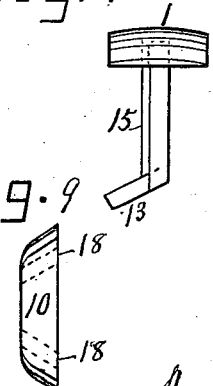
Figures 8, 9:
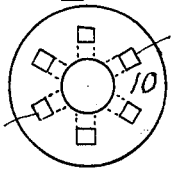
Figure 10:
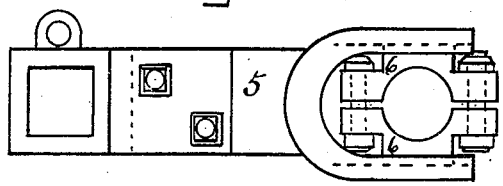
Figures 11, 12:
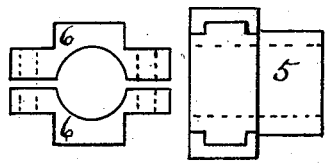
Figure 13:
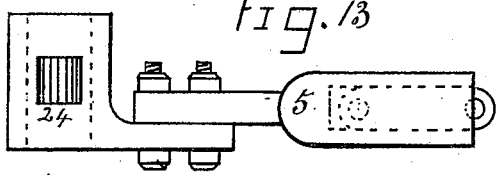
Figure 14:
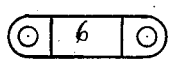
Figure 15:
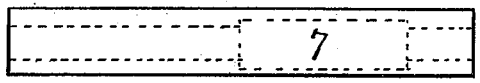
Figure 16:
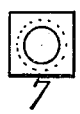
Figure 17:
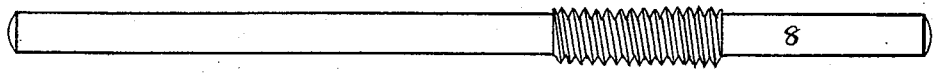
Figure 18:
Figure 19:
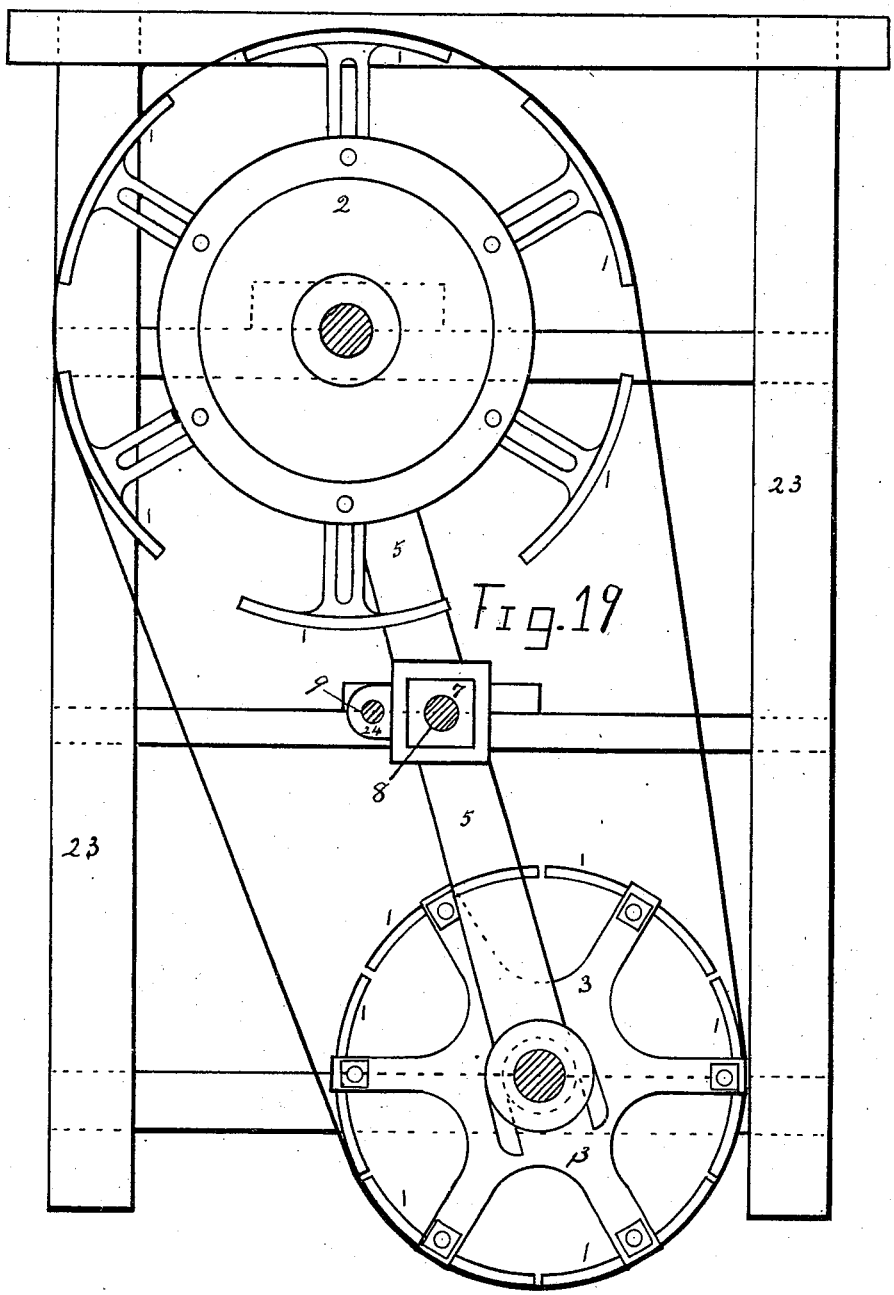

Figure 1 is a front view of my invention. The lower shaft and all on it are shown in section. Fig. 2 is a face view of the cone. Fig. 3 is a side view of the cone. Fig. 4 is a face view of the spider. Fig. 5 is a side view of the spider. Fig. 6 is a face view of one section of the expanding pulley. Fig. 7 is an edge view of one of the pulley-sections, showing the foot. Figs. 8 and 9 are views of the adjusting-collar. Figs. 10 and 13 are views of the shifting fork. Figs. 11, 12, and 14 are views of the split collar. Figs. 15 and 16 are views of the square tube. Figs. 17 and 18 are views of the screw-threaded shafts. Fig. 19 is a vertical section taken on a vertical line inside of one of the hangers.

Similar numerals of reference refer to same parts in the several views.

1 represents the expanding pulley; 2, the cone; 3, the spider; 4, the square guide-rods; 5, the shifting forks; 6, the split collar; 8, the supporting-shaft for the square tube 7; 9, the right and left hand screw-threaded shaft; 10, the regulating collar or disk; 12, the regulating-bolt; 13, the inclined foot. These parts are all made of metal.

The expanding pulley I make in six sections. Each section is constructed as shown in Figs. 6 and 7. The arm of each section has a slot 14 (see Fig. 6) and a rib 15. (See Fig. 7.) This rib is fitted to slide in between the ribs 16 on the face of the cone 2. (See Fig. 2.) Each section of the pulley is fixed so as to slide between the ribs 16 by a bolt to the cone 2. The spider 3 is formed with six arms 17. To these arms are fixed guide-rods 4. The central lower ends of these rods are inserted in pockets 18. (See the collar 10, Figs. 8 and 9.) The rods 4 and ribs 19 of the spider 3 form slots 20. (See Fig. 1.) In these slots 20 are fitted the feet 13 of the pulley-arms. The cones 2 are fastened to the shafts 14' by set-screws, and the spiders 3 are mounted loose on the shafts 14.

On the right-hand end of shaft 8 is a sprocket-wheel and a chain belt 21. On the left-hand end of the shaft 9 is a sprocket-wheel and a chain belt 22. The shafts 14 and 14', carrying the expansion-pulleys, are mounted in hangers 23. (See Fig. 1.) These two shafts are placed directly, or nearly directly, one under the other, the lower shaft 14' being the driver, the top shaft the driven.

The drawings, Fig. 1, show the lower pulley contracted and the upper pulley expanded to their full extent. By pulling the chain belt 21 the screw-thread on the shaft 8, working in the tube 7, will shift the square tube 7, carrying the shifting forks 5, to the left hand. This will expand the lower pulley and contract the upper pulley, and the speed of the driven shaft 14 will be increased.

Should it be desired to use the device to stop the top driven shaft, the chain belt 22 is pulled, which turns the shaft 9. The left-hand screw in the lug 24 will move the shifting fork 5 on the left hand of the square tube 7. This will contract the top pulley, (the bottom pulley being contracted as far as it can be,) the belt will be slackened, and stop the top driven shaft 14.

When the two pulleys are both expanded, the shaft 9 will operate both forks 5, and they will be moved on the tube 7 from the collars 25, the right and left hand screws acting on both lugs 24 and 24'.

When starting the pulleys by the shaft 9, the right and left hand screw-threads shift the forks 5 hard up against the collars 25, which are fastened on the tube 7 by set-screws.

To adjust the slots 20 under the guide-bars 4, so that the slots will properly fit the foot 13, the collar 10 is moved by the regulating-bolts 12. (Shown in Figs. 4 and 5.)

Having as above fully described my invention, what I claim as new, and desire to secure by Letters Patent, is—

1. In a mechanism for changing speeds, and stopping and starting machinery by a driven belt, the combination of the following elements: two expanding pulleys, each pulley being constructed of a series of sections, two fixed cones 2, said cones being provided with a series of ribbed guides 16, between which guides, the arms of the sectional parts of the pulley slide, when expanding or contracting, two sliding spiders 3, said spiders being each provided with a series of square guide-bars 4, said guide-bars and ribs 19, forming slots 20, in which slots slides the foot 13, on the central part of each pulley-section, the two spiders being operated simultaneously, one expanding and the other contracting, changing the speed, or stopping, or starting, as shown and described.

2. An expansible-pulley mechanism comprising two shifting forks, a square tube, a supporting-shaft, upon which shaft is cut a screw-thread, by which screw the two forks are moved at one and the same time, to the right or left hand, one fork expanding, and one fork contracting a pulley, all substantially as shown and described.

3. An expansible-pulley mechanism comprising two shifting forks, a square tube, a supporting-shaft, and a supplementary shaft 9, upon which shaft is cut a right and a left hand screw-thread, all substantially as shown, described, and for the purpose specified.

4. An expansible-pulley mechanism comprising the combination of a sliding collar, or disk, having a series of inclined pockets, a series of guide-bars, regulating-bolts for regulating and adjusting the guide-bars, and slots for the feet 13, on the end of each arm of the expanding-pulley sections, all substantially as shown and described.

MARK MUSGREAVE.

Witnesses:
    JOHN SHINN,
    W. MUSGREAVE.